United States Patent
Okuda

(10) Patent No.: US 9,654,199 B2
(45) Date of Patent: May 16, 2017

(54) RELAY APPARATUS AND COMMUNICATION METHOD

(71) Applicant: FUJITSU LIMITED, Kawasaki-shi, Kanagawa (JP)

(72) Inventor: Masato Okuda, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 14/193,635

(22) Filed: Feb. 28, 2014

(65) Prior Publication Data
US 2014/0293891 A1 Oct. 2, 2014

(30) Foreign Application Priority Data
Mar. 28, 2013 (JP) .................................. 2013-068452

(51) Int. Cl.
*H04B 7/155* (2006.01)

(52) U.S. Cl.
CPC ................................ *H04B 7/15528* (2013.01)

(58) Field of Classification Search
CPC ........ H04B 7/15; H04B 7/155; H04B 7/15528
See application file for complete search history.

(56) References Cited

U.S. PATENT DOCUMENTS

| | | | |
|---|---|---|---|
| 2009/0279429 A1* | 11/2009 | Griffoul | 370/230 |
| 2010/0115360 A1* | 5/2010 | Seok | H04L 1/1822 714/748 |
| 2011/0292793 A1 | 12/2011 | Kanada et al. | |

FOREIGN PATENT DOCUMENTS

| | | |
|---|---|---|
| JP | 2007-60494 | 3/2007 |
| JP | 2011-61253 | 3/2011 |
| JP | 2011-250142 | 12/2011 |

OTHER PUBLICATIONS

Japanese Office Action dated Nov. 1, 2016 in corresponding Japanese Patent Application No. 2013-068452 (4 pages) (3 pages English Translation).

* cited by examiner

*Primary Examiner* — Feben M Haile
(74) *Attorney, Agent, or Firm* — Staas & Halsey LLP

(57) ABSTRACT

An apparatus includes a memory; and a processor coupled to the memory and configured to execute a process, the process comprising, transferring a first acknowledge packet to the first device from the second device, the first acknowledge packet indicating that the second device anticipates receiving a first packet among the plurality of packets having been transferred from the first device to the second device; determining whether a second acknowledge packet indicates that the second device anticipates receiving the first packet, when the apparatus receives the second acknowledge packet from the second device after receiving the first acknowledge packet, and delaying transferring the second acknowledge packet to the first device when it is determined that the second device anticipates receiving the first packet.

13 Claims, 17 Drawing Sheets

| IP ADDRESS | TCP PORT NUMBER | TCP FLOW ID | DELIVERY CONFIRMED SN |
|---|---|---|---|
| IP#a | PORT#A | 1 | 4830 |
| IP#b | PORT#B | 2 | 249 |
| IP#c | PORT#C | 3 | 5893 |

| IP ADDRESS | TCP PORT NUMBER | TCP FLOW ID | TRANSMISSION FAILURE SN |
|---|---|---|---|
| IP#a | PORT#A | 1 | 4835 |
| IP#x | PORT#X | 5 | 333 |
| IP#y | PORT#Y | 6 | 698 |

FIG. 14

| IP ADDRESS | TCP PORT NUMBER | TCP FLOW ID | TRANSMITTED SN | LINK | DELIVERY CONFIRMATION |
|---|---|---|---|---|---|
| IP#a | PORT#A | 3 | 500 | FIRST RADIO LINK | UNCONFIRMED |
| IP#a | PORT#A | 3 | 1000 | SECOND RADIO LINK | CONFIRMED |
| IP#a | PORT#A | 3 | 1500 | SECOND RADIO LINK | UNCONFIRMED |
| IP#a | PORT#A | 3 | 2000 | FIRST RADIO LINK | CONFIRMED |
| IP#a | PORT#A | 3 | 2500 | SECOND RADIO LINK | CONFIRMED |
| IP#a | PORT#A | 3 | 3000 | FIRST RADIO LINK | UNCONFIRMED |
| ... | ... | ... | ... | ... | ... |

22

RELAY APPARATUS AND COMMUNICATION METHOD

CROSS-REFERENCE TO RELATED APPLICATIONS

This application is based upon and claims the benefit of priority of the prior Japanese Patent Application No. 2013-068452, filed on Mar. 28, 2013, the entire contents of which are incorporated herein by reference.

FIELD

The embodiments discussed herein are related to an apparatus and a method.

BACKGROUND

Wireless communication devices are known that conduct wireless communication through a plurality of radio links having different wireless access protocols.

Japanese Laid-open Patent Publication No. 2011-250142 discusses a communication device that is equipped with an upper layer processor that initiates a retransmission process for duplicate acknowledgment (ACK) packets in response to the reception of such packets. The communication device is equipped with a lower layer processor that organizes the plurality of duplicate ACKs received over a network into one and transfers the one duplicate ACK to the upper.

Japanese Laid-open Patent Publication No. 2007-60494 discusses a network system in which packets, which are transmitted from a transmission-side sorting device in a transmission terminal via a reception-side sorting device to arrive at a reception terminal, are sent over a multi-link that bundles a plurality of links between the transmission-side sorting device and the reception-side sorting device. The reception-side sorting device includes an alignment processor that aligns the packets in a packet order on the basis of an overall sequence of numbers of the received packets and transmits the packets to the reception terminal.

Japanese Laid-open Patent Publication No. 2011-61253 discusses a communication network system in which a communication terminal conducts packet communication with a communication node on a communication network through a plurality of radio links. The communication terminal is equipped with a terminal-side radio link integrating device for conducting a collecting process to collect, from connected radio links, downlink packet data from the communication node. The terminal-side radio link integrating device erases headers from packet data received from the radio links and realigns the packets according to sequence numbers included in the packet data to consolidate the packets as downlink packet data.

SUMMARY

According to an aspect of the invention, an apparatus includes a memory; and a processor coupled to the memory and configured to execute a process, the process comprising, transferring a first acknowledge packet to the first device from the second device, the first acknowledge packet indicating that the second device anticipates receiving a first packet among the plurality of packets having been transferred from the first device to the second device; determining whether a second acknowledge packet indicates that the second device anticipates receiving the first packet, when the apparatus receives the second acknowledge packet from the second device after receiving the first acknowledge packet, and delaying transferring the second acknowledge packet to the first device when it is determined that the second device anticipates receiving the first packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of an ACK table;

FIG. 10 illustrates an example of a transmission failure information table;

FIG. 14 illustrates an example of a packet management table;

DESCRIPTION OF EMBODIMENTS

According to a study by the inventor, a packet arrival order may become reversed when transmitting one data flow in parallel over a plurality of radio links due to delay differences between the radio links, and thus it is clear that there is a concern that retransmission may be requested even without packet loss when using an accumulation acknowledgment protocol when conducting packet delivery confirmation.

This type of retransmission request may be suppressed by aligning the order of the received packets in a reception device. However, the following problems arise when an order alignment function for reception packets is introduced into the reception device.

(1) The amount of processing in the reception device increases.

(2) The order alignment is carried out in a layer lower than the layer that controls retransmission. As a result, a change in the kernel or operating system (OS) of the reception device may occur.

(3) Overhead increases when additional sequence numbers for order alignment are assigned to the packets.

According to the following embodiments, the retransmission of packets that occurs due to a reversal in the packet arrival order may be reduced using an approach that is different from the order alignment in the reception device when packet delivery confirmation is conducted with an accumulation acknowledgment protocol.

1. Configuration of Communication System

Figure 1:
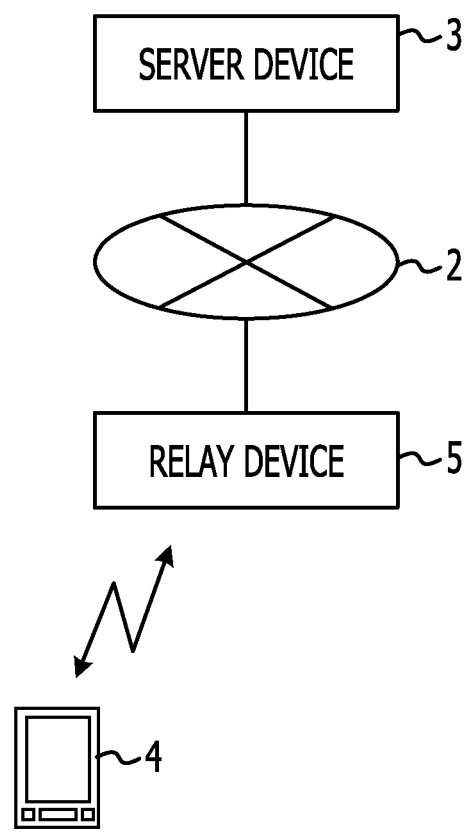
FIG. 1 describes an example of a communication system configuration.

Preferred embodiments of the present disclosure will be explained hereinbelow with reference to the attached drawings. FIG. 1 describes an example of a communication system configuration. A communication system 1 is provided with a communication network 2, a server device 3, a mobile station device 4, and a relay device 5. In the following explanation, a server device and a mobile station device are respectively referred to as a "server" and a "mobile station."

The mobile station 4 is a communication device for conducting packet communication with the server 3. The relay device 5 is provided with a communication interface that is able to transmit and receive packets transferred over the communication network 2, and a wireless communication circuit for a wireless access protocol that the mobile station 4 is able to use.

The relay device 5 receives packets transmitted from the server 3 to the mobile station 4 from the server 3 via the communication network 2, and transmits the same packets to the mobile station 4 via a radio link between the mobile station 4 and the relay device 5. Moreover, the relay device 5 receives packets transmitted from the mobile station 4 to the server 3 via the radio link between the mobile station 4 and the relay device 5, and transmits the same packets to the server 3 via the communication network 2. The relay device 5 may also be, for example, a femto-base station device that covers an area with a radius of about 10 m and that is equipped with a wireless LAN interface in a cellular communication system.

The mobile station 4 and the relay device 5 are equipped with a plurality of different wireless communication circuits. The plurality of wireless communication circuits may be, for example, wireless communication circuits for a plurality of different wireless access protocols or may be wireless communication circuits for the same wireless access protocol. The wireless access protocols may include, for example, a wireless access protocol for a cellular communication system such as a third-generation mobile communication system or long term evolution (LTE), or Worldwide Interoperability for Microwave Access (WiMAX), or a wireless local area network (LAN).

The mobile station 4 and the relay device 5 use the plurality of wireless communication circuits in parallel to sort and transfer, to a plurality of different radio links, packets in one data flow transmitted from the server 3 to the mobile station 4. The plurality of wireless communication circuits used for packet transfer may be, for example, wireless communication circuits for a plurality of different wireless access protocols or may be wireless communication circuits for the same wireless access protocol.

Delivery confirmation for the packets transmitted from the server 3 toward the mobile station 4 is conducted with an accumulation acknowledgment protocol. An example of a communication protocol between the mobile station 4 and the server 3 is the transmission control protocol (TCP).

The following explanation uses the example of TCP for the communication protocol between the mobile station 4 and the server 3. However, this example is not intended to be used for limiting the communication system described in the specification to a communication system that only uses TCP. The communication system described in the specification may be widely used in a communication system for conducting packet delivery confirmation with an accumulation acknowledgment protocol in which the same flow of packets are transferred between wireless segments through a plurality of different radio links.

2. First Embodiment

Figure 2:
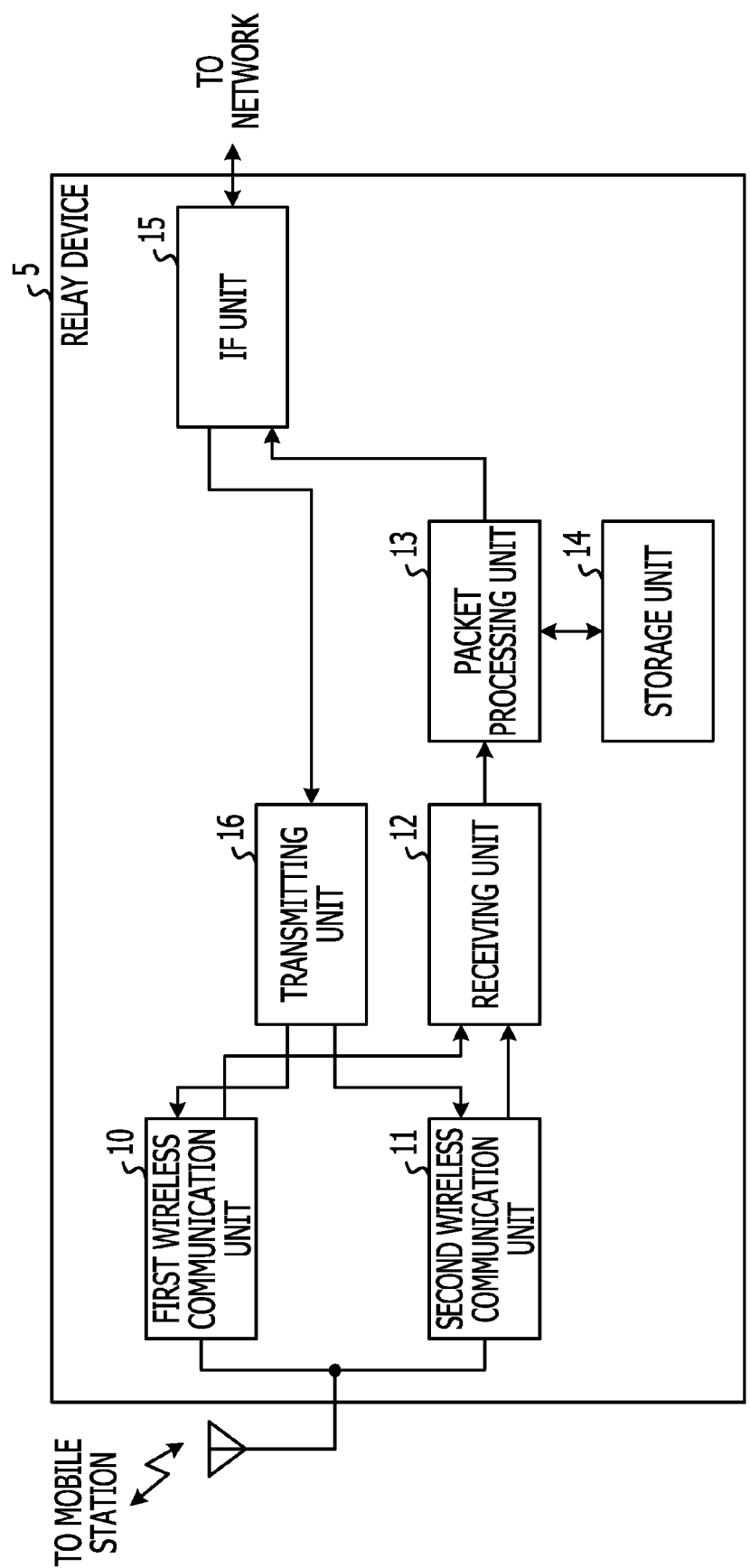
FIG. 2 is a functional configuration of a first example of a relay device.

FIG. 2 is a functional configuration of a first example of a relay device 5. The relay device 5 includes a first wireless communication unit 10, a second wireless communication unit 11, a receiving unit 12, a packet processing unit 13, a storage unit 14, an interface unit 15, and a transmitting unit 16. In the following explanation and accompanying drawings, "interface" is abbreviated as "IF."

The first wireless communication unit 10 executes physical layer protocols and data link layer protocols inherent to a specific wireless access protocol, and receives and transmits packets between the mobile station 4 and the relay device 5 through a radio link. The second wireless communication unit 11 executes physical layer protocols and data link layer protocols inherent to a specific wireless access protocol, and receives and transmits packets between the mobile station 4 and the relay device 5 through a radio link.

The second wireless communication unit 11 receives and transmits packets between the mobile station 4 and the relay device 5 through a radio link that differs from the radio link through which the first wireless communication unit 10 receives and transmits packets. In the following explanation, the links used by the first wireless communication unit 10 and the second wireless communication unit 11 for receiving and transmitting packets will be referred to respectively as a "first radio link" and a "second radio link."

The wireless access protocol to which the first wireless communication unit 10 conforms may be the same protocol or a different protocol from the wireless access protocol to which the second wireless communication unit 11 conforms. In the following explanation, the wireless access protocols to which the first wireless communication unit 10 and the second wireless communication unit 11 conform will be referred to respectively as a "first protocol" and a "second protocol." The first protocol may be, for example, Wireless Fidelity (WiFi) and the second protocol may be, for example, LTE.

The first wireless communication unit 10 and the second wireless communication unit 11 each send packets received from the mobile station 4 to the receiving unit 12, and transmit packets received from the transmitting unit 16 to the mobile station 4 through the respective radio links.

The receiving unit 12 conducts an error check on the packets received from the first wireless communication unit 10 and the second wireless communication unit 11 and then transfers the packets to the packet processing unit 13. The IF unit 15 transfers packets received from the server 3 over the communication network 2, to the transmitting unit 16. The transmitting unit 16 determines whether to transmit each packet received from the IF unit 15, through the first radio link or the second radio link.

The transmitting unit 16 may use the first radio link and the second radio link in parallel to transmit packets that belong to the same flow addressed to the mobile station 4. Specifically, the transmitting unit 16 may transmit any of the packets belonging to a flow addressed to the mobile station 4 through the first radio link and may transmit other packets belonging to the same flow through the second radio link.

The number of radio links used for packet communication between the relay device 5 and the mobile station 4 is not limited to two. The relay device 5 may transmit the packets belonging to the same flow addressed to the mobile station 4 through three or more radio links in parallel. The relay device 5 may further include a wireless communication unit in addition to the first wireless communication unit 10 and the second wireless communication unit 11.

Upon receiving an ACK packet from the receiving unit 12, the packet processing unit 13 then determines whether an ACK packet that belongs to the same flow as the received ACK packet and that has the same acknowledgment number as the received ACK packet, has already been transmitted. A packet that belongs to the same flow as the flow to which previously received ACK packet belongs and has the same acknowledgment number is, for example, a duplicate ACK. In the following explanation, a duplicate ACK is used as an example of a packet that belongs to the same flow as a flow to which previously received ACK packet belongs and has the same acknowledgment number. If a received ACK packet is a duplicate ACK packet, the packet processing unit 13 stores the received duplicate ACK packet in the storage unit 14.

If a received ACK packet is not a duplicate ACK packet, the packet processing unit 13 transfers the received duplicate ACK packet to the IF unit 15. Moreover, among the duplicate ACK packets stored in the storage unit 14, the packet processing unit 13 discards duplicate ACK packets transmitted by the mobile station 4 that are duplicates of packets that have received delivery confirmation based on a received ACK packet.

For example, a state is assumed in which packets with sequence numbers 1, 2, 4 to 6 and 8 are delivered to the mobile station 4 and a total of four duplicate ACK packets (ACK indicates that the mobile station receives the packets up to sequence number 2 and then anticipates the reception of the packet having sequence number 3) are stored in the storage unit 14 due to the delivery of packets having sequence numbers 4 to 6 and 8. When the packet having sequence number 3 is delivered, the delivery of packets having sequence numbers 4 to 6 are confirmed due to the mobile station 4 transmitting an ACK packet to notify the delivery of the packet having sequence number 6. The packet processing unit 13 discards the four duplicate ACK packets that the mobile station transmitted due to the delivery of the packets having sequence numbers 4 to 6.

The packet processing unit 13 transfers duplicate ACK packets that have been stored in the storage unit 14 for more than a certain waiting period, to the IF unit 15. The packet processing unit 13 transfers received packets to the IF unit 15 when packets other than ACK packets are received from the receiving unit 12. The waiting period for the packet processing unit 13 may be set, for example, as a waiting period having a longer time period than a transfer delay difference between the first radio link and the second radio link. In this case, a transfer delay of the first radio link and a transfer delay of the second radio link may include delays due to retransmission controls conducted by the first wireless communication unit 10 and the second wireless communication unit 11.

The IF unit 15 transfers packets received from the packet processing unit 13 over the communication network 2, to the server 3.

Figure 3:
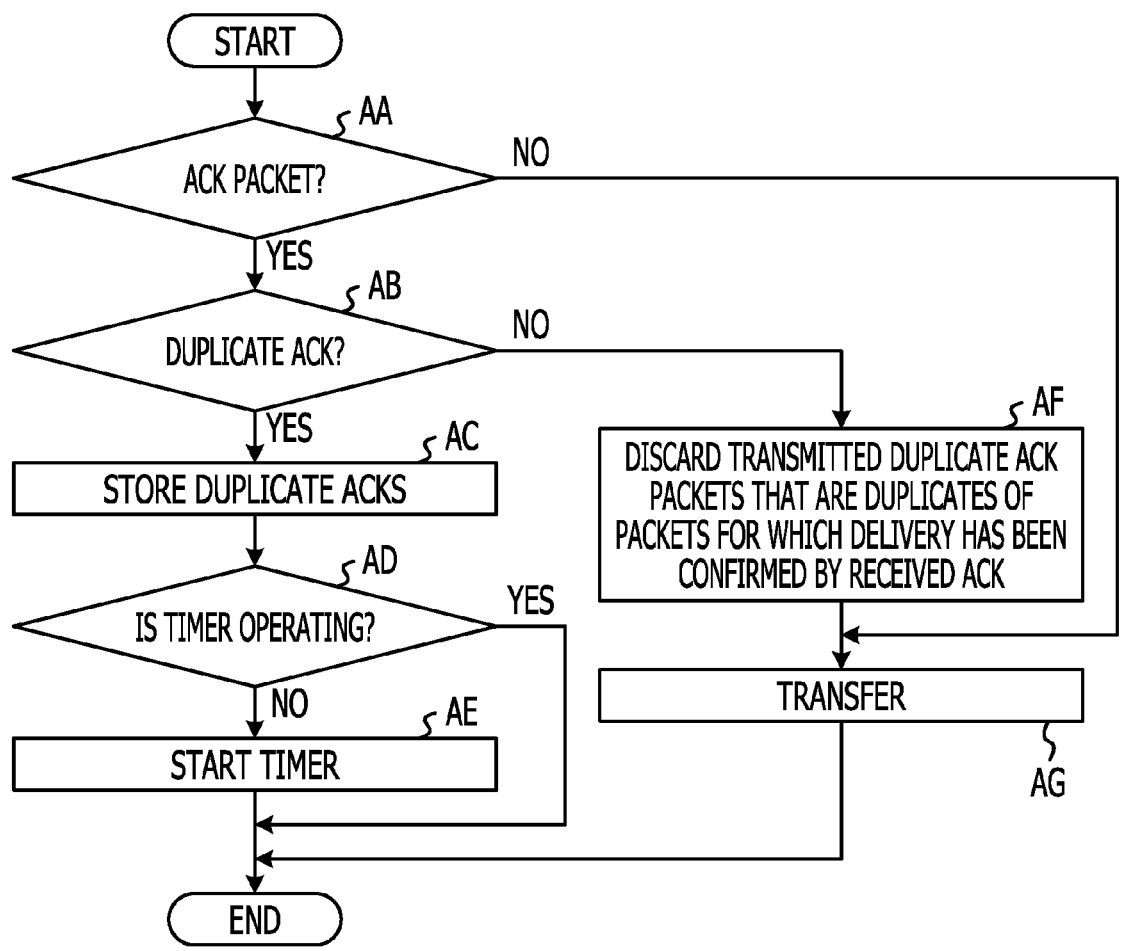
FIG. 3 describes a first example of a relay device operation during packet reception.

FIG. 3 describes a first example of a relay device 5 operation during packet reception. The packet processing unit 13 in operation AA determines whether a packet received from the receiving unit 12 is an ACK packet. If the received packet is an ACK packet (operation AA: Y), the operation advances to operation AB. If the received packet is not an ACK packet (operation AA: N), the operation advances to operation AG.

The packet processing unit 13 in operation AB determines whether the received ACK packet is a duplicate ACK packet. The packet processing unit 13 may determine whether the received ACK packet is a duplicate ACK packet by referring to, for example, an ACK table 20 that stores the sequence numbers for which delivery has been confirmed for each flow.

FIG. 4 is an example of the ACK table 20. The ACK table 20 may be stored in the storage unit for example. The ACK table 20 includes information elements of an "IP address," a "TCP port number," a "TCP flow ID," and a "delivery confirmed SN."

The IP address, the TCP port number, and the TCP flow ID respectively indicate an internet protocol (IP) address, a TCP port number, and a flow identifier of the mobile station 4 that is the destination of each flow. The delivery confirmed SN indicates the highest sequence number of the packet for which delivery has been confirmed continuing from the start of transmission of each flow.

The first entry in FIG. 4 indicates that the delivery of packets belonging to the flow having flow identifier "1" addressed to the IP address "IP#a" and the TCP port number "Port#a" has been confirmed up to sequence number "4830."

The packet processing unit 13 determines whether the received ACK packet is a duplicate ACK packet on the basis of the acknowledgment number of the received ACK packet and the value of the delivery confirmed SN stored in the ACK table 20.

If the received packet is a duplicate ACK packet (operation AB: Y), the operation advances to operation AC. If the received packet is not a duplicate ACK packet (operation AB: N), the operation advances to operation AF.

The packet processing unit 13 in operation AC stores the received duplicate ACK packet in the storage unit 14. The packet processing unit 13 in operation AD determines whether a timer is operating. If the timer is not operating (operation AD: N), the operation advances to operation AE. If the timer is operating (operation AD: Y), the operation is finished.

The packet processing unit 13 in operation AE starts the timer. The processing is then finished.

The packet processing unit 13 in operation AF discards duplicate ACK packets transmitted by the mobile station 4 that are duplicates of packets that have received delivery confirmation based on a received ACK packet among the duplicate ACK packets stored in the storage unit 14.

The packet processing unit 13 in operation AG transfers the received packets to the IF unit 15. The IF unit 15 transfers packets received from the packet processing unit 13 over the communication network 2, to the server 3.

Figure 5:
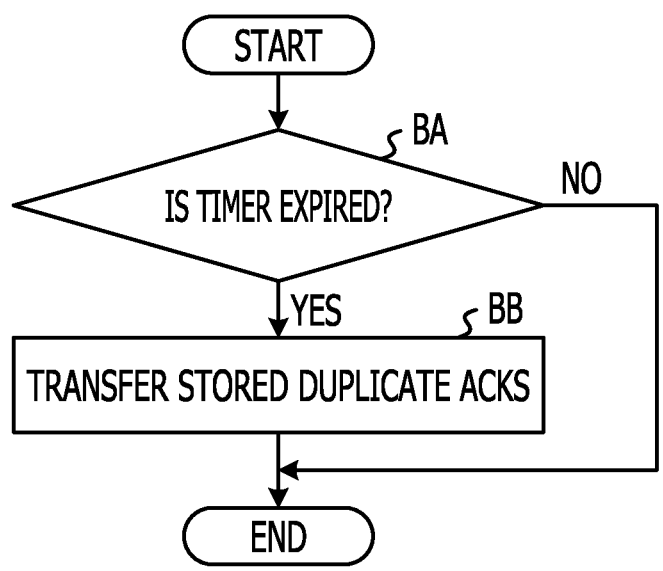
FIG. 5 describes an example of a timer monitoring operation in a relay device.

FIG. 5 describes an example of a timer monitoring operation in the relay device 5. The packet processing unit 13 may execute the timer monitoring operation, for example, at a certain cycle. The packet processing unit 13 in operation BA determines whether the timer started in operation AE in FIG. 3 has expired, that is, whether the elapse of the certain waiting period has been detected.

If the timer has expired (operation BA: Y), the processing advances to operation BB. If the timer has not expired (operation BA: N), the timer monitoring operation is finished. The packet processing unit 13 in operation BB transfers the duplicate ACK packets stored in the storage unit 14 to the IF unit 15. The IF unit 15 transfers the duplicate ACK packets received from the packet processing unit 13 over the communication network 2, to the server 3.

According to the present embodiment, duplicate ACK packets do not reach the transmission-side server 3 since the relay device 5 discards the duplicate ACK packets even if the duplicate ACK packets are delivered in an order that is a reverse order of the packet arrival order in the mobile station 4 on the packet reception side. As a result, retransmission of packets by the server 3 due to a reversal of the packet arrival order is reduced.

3. Second Embodiment

When a reversal of arrival order of the packets occurs in the mobile station 4 in the first embodiment, there is a concern that a plurality of duplicate ACK packets with the same acknowledgment number may accumulate in the storage unit 14.

Further, the duplicate ACK packets accumulated in the storage unit 14 are transferred to the server 3 when the timer expires. A protocol that uses the accumulation acknowledgment protocol for packet retransmission control is a protocol that retransmits packets when a transmitting device receives a certain number of duplicate ACK packets. For example, a transmitting device using the abovementioned TCP conducts retransmission upon receiving duplicate ACK packets three times. In this case, transmission of more than three duplicate ACK packets is unnecessary even if four or more duplicate ACK packets accumulate in the storage unit 14.

In a second embodiment, the number of duplicate ACK packets having the same acknowledgment number stored in the storage unit 14 is made to be less than the number of receptions. For example, the packet processing unit 13 stores one duplicate ACK packet having the same acknowledgment number in the storage unit 14.

Further, the packet processing unit 13 transfers the duplicate ACK packets having the same acknowledgment number to the IF unit 15 a certain number of times regardless of the number of receptions of the duplicate ACK packets having the same acknowledgment number when the timer has expired. For example, the packet processing unit 13 transfers the duplicate ACK packets to the IF unit 15 three times.

Figure 6:
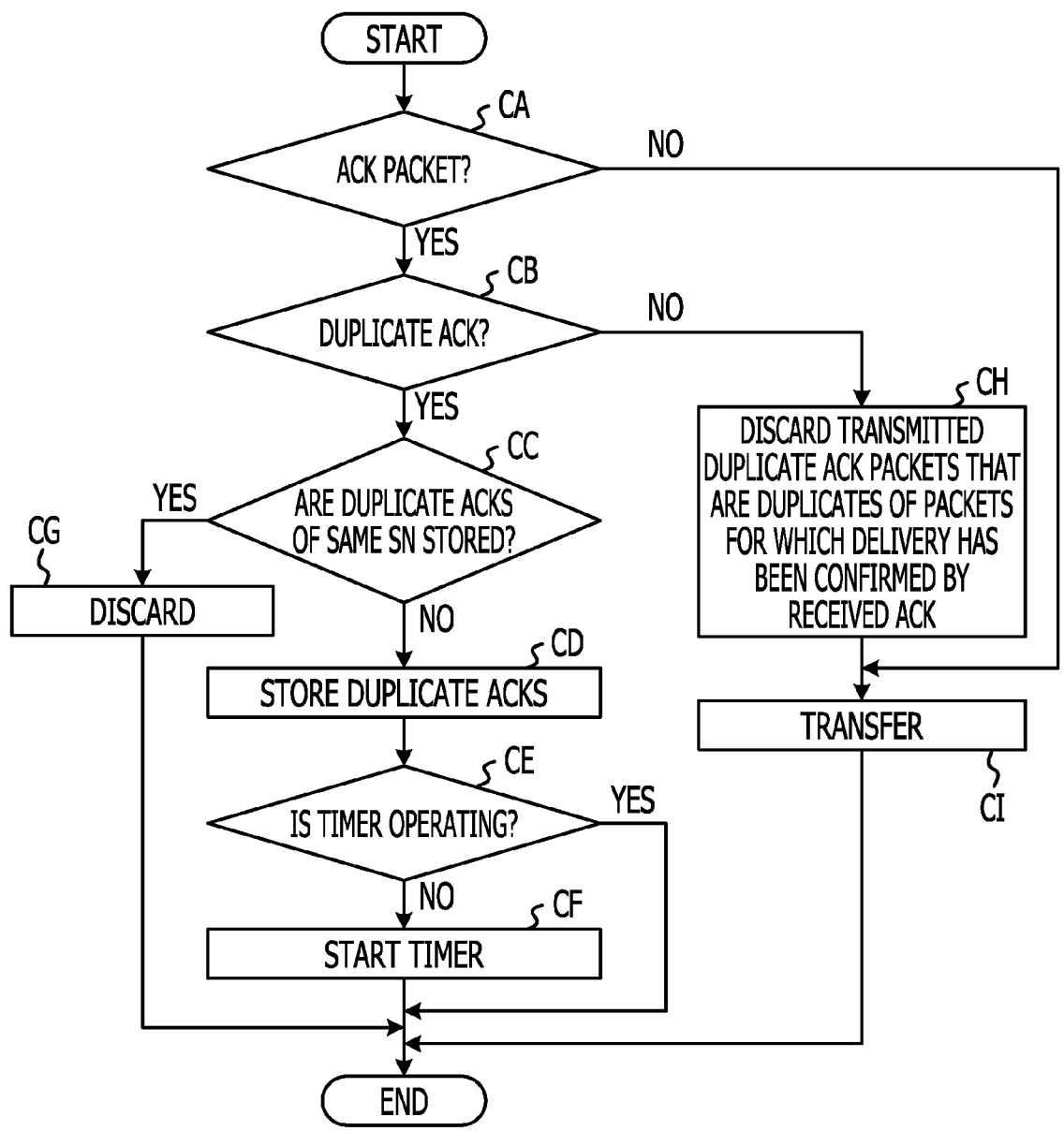
FIG. 6 describes a second example of a relay device operation during packet reception.

FIG. 6 describes a second example of the relay device 5 operation during packet reception. The packet processing unit 13 in operation CA determines whether a packet received from the receiving unit 12 is an ACK packet. If the received packet is an ACK packet (operation CA: Y), the operation advances to operation CB. If the received packet is not an ACK packet (operation CA: N), the operation advances to operation CI.

The packet processing unit 13 in operation CB determines whether the received ACK packet is a duplicate ACK packet. If the received packet is a duplicate ACK packet (operation CB: Y), the operation advances to operation CC. If the received packet is not a duplicate ACK packet (operation CB: N), the operation advances to operation CH.

The packet processing unit 13 in operation CC determines whether a duplicate ACK packet having an acknowledgment number the same as that of the received duplicate ACK packet is stored in the storage unit 14. If a duplicate ACK with the same acknowledgment number is stored in the storage unit 14 (operation CC: Y), the operation advances to operation CG. If a duplicate ACK with the same acknowledgment number is not stored in the storage unit 14 (operation CC: N), the operation advances to operation CD.

The operations CD to CF are the same as the operations AC to AE described in reference to FIG. 3. The packet processing unit 13 in operation CG discards the received duplicate ACK packet. The processing is then finished. The operations CH to CI are the same as the operations AF to AG described in reference to FIG. 3.

According to the present embodiment, the storage capacity on the storage unit 14 for storing duplicate ACKs may be reduced. Moreover, the frequency of transmitting duplicate ACKs to the server 3 may be reduced.

4. Third Embodiment

Figure 7:
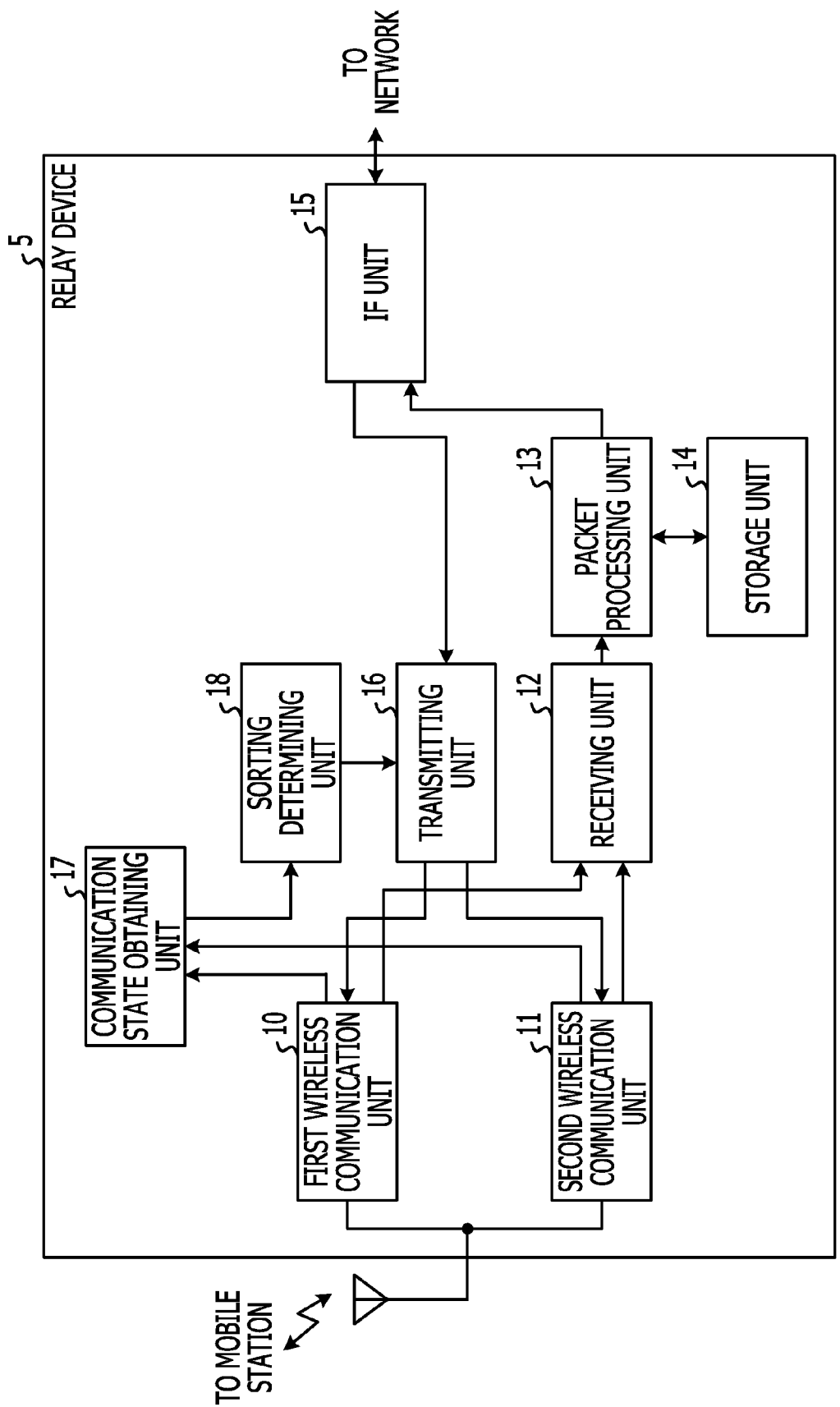
FIG. 7 is a functional configuration of a second example of a relay device.

FIG. 7 is a functional configuration of a second example of the relay device 5. The relay device 5 of the third embodiment determines a sorting ratio for sorting packets among the first radio link and the second radio link in response to a communication state with the mobile station 4. The relay device 5 is provided with a communication state obtaining unit 17 and a sorting determining unit 18.

The first wireless communication unit 10 and the second wireless communication unit 11 notify the communication state obtaining unit 17 about link states of the first radio link and the second radio link. The link states may include, for example, the link quality of each of the first radio link and the second radio link and/or respective utilization rates $\rho 1$ and $\rho 2$ and an object flow throughput throughout the entire link of each of the first radio link and the second radio link. The communication information obtaining unit 17 notifies the sorting determining unit 18 about the link states received from the first wireless communication unit 10 and the second wireless communication unit 11.

The sorting determining unit 18 determines, in accordance with the link states received from the communication state obtaining unit 17, a sorting ratio that is a ratio between the number of packets to transmit through the first radio link and the number of packets to transmit through the second radio link. The transmitting unit 16 determines the radio link for transferring the packets so that the packets are transferred on the first radio link and/or the second radio link in accordance with the sorting ratio received from the sorting determining unit 18.

For example, the sorting determining unit 18 may determine the sorting ratio according to the following determination methods. The sorting determining unit 18 estimates a modulation and coding scheme (MCS) to be used in each of the links in accordance with the quality of the first radio link and the quality of the second radio link. The sorting determining unit 18 estimates a utilization rate $\rho_{flow1}$ of the first radio link for an object flow and utilization rate $\rho_{flow2}$ of the second radio link for an object flow in accordance with a throughput of the object flow, the MCS, and the entire link utilization rates $\rho_1$ and $\rho_2$.

Figure 8:
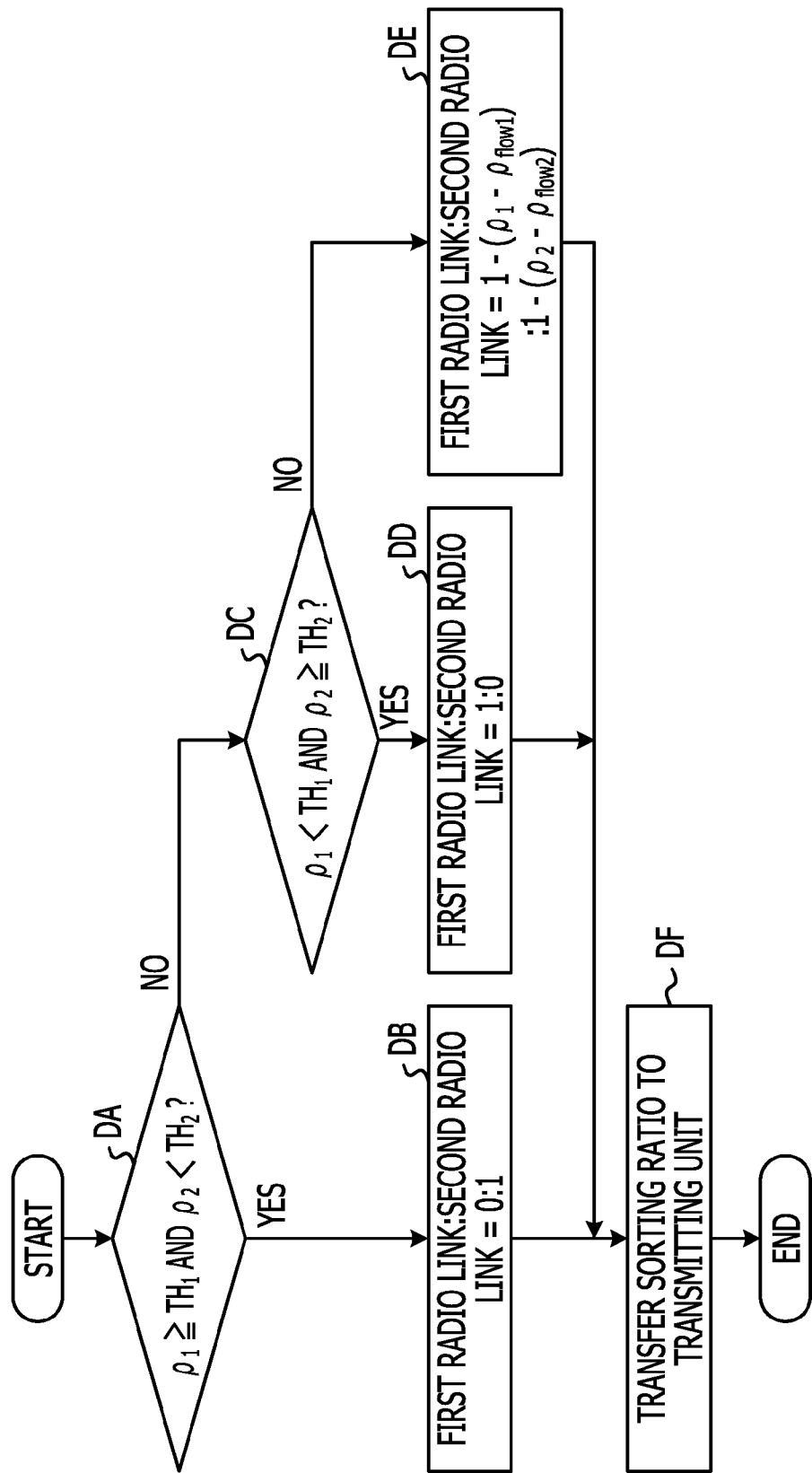
FIG. 8 is an example of a sorting ratio determining operation.

FIG. 8 is an example of a sorting ratio determining operation. The sorting determining unit 18 in operation DA determines whether the utilization rate $\rho_{flow1}$ of the first radio link is equal to or higher than a certain threshold $TH_1$, and whether the utilization rate $\rho_{flow2}$ of the second radio link is less than a certain threshold $TH_2$.

If the utilization rate $\rho_{flow1}$ of the first radio link is equal to or higher than the certain threshold $TH_1$ and the utilization rate $\rho_{flow2}$ of the second radio link is less than the certain threshold $TH_2$ (operation DA: Y), the operation advances to operation DB. If the utilization rate $\rho_{flow1}$ of the first radio link is not equal to or higher than the certain threshold $TH_1$, or the utilization rate $\rho_{flow2}$ of the second radio link is less than the certain threshold $TH_2$ (operation DA: N), the operation advances to operation DC.

The sorting determining unit 18 in operation DB sets a sorting ratio of "0" for the number of packets to be transmitted on the first radio link and sets a sorting ratio of "1" for the number of packets to be transmitted on the second radio link. Then the operation advances to operation DF.

The sorting determining unit 18 in operation DC determines whether the utilization rate $\rho_{flow1}$ of the first radio link is less than the certain threshold $TH_1$, and whether the utilization rate $\rho_{flow2}$ of the second radio link is equal to or higher than the certain threshold $TH_2$. If the utilization rate $\rho_{flow1}$ of the first radio link is less than the certain threshold $TH_1$ and the utilization rate $\rho_{flow2}$ of the second radio link is equal to or higher than the certain threshold $TH_2$ (operation DC: Y), the operation advances to operation DD. If the utilization rate $\rho_{flow1}$ of the first radio link is not less than the certain threshold $TH_1$, and the utilization rate $\rho_{flow2}$ of the second radio link is not equal to or higher than the certain threshold $TH_2$ (operation DC: N), the operation advances to operation DE.

The sorting determining unit 18 in operation DD sets a sorting ratio of "1" for the number of packets to be transmitted on the first radio link and sets a sorting ratio of "0" for the number of packets to be transmitted on the second radio link. Then the operation advances to operation DF.

The sorting determining unit 18 in operation DE sets the sorting ratio of the number of packets to be transmitted through the first radio link to be "$1-(\rho_1-\rho_{flow1})$." The sorting determining unit 18 in operation DE sets the sorting ratio of the number of packets to be transmitted through the first radio link to be "$1-(\rho_2-\rho_{flow2})$." Then the operation advances to operation DF.

The sorting determining unit 18 in operation DF transfers the determined sorting ratios to the transmitting unit 16.

According to the present embodiment, a ratio of packets to be transmitted on either of the links may be determined in accordance with the communication states of the plurality of radio links. As a result, for example, the number of packets to be transmitted on a radio link with a more favorable communication state may be increased in comparison to the number of packets to be transmitted on another radio link, and thus communication quality may be improved. The sorting ratio for sorting packets among the first radio link and the second radio link in response to a communication state with the mobile station 4 may be determined by the communication state obtaining unit 17 and the sorting determining unit 18 in the same way in other embodiments described herein.

5. Fourth Embodiment

Figure 9:
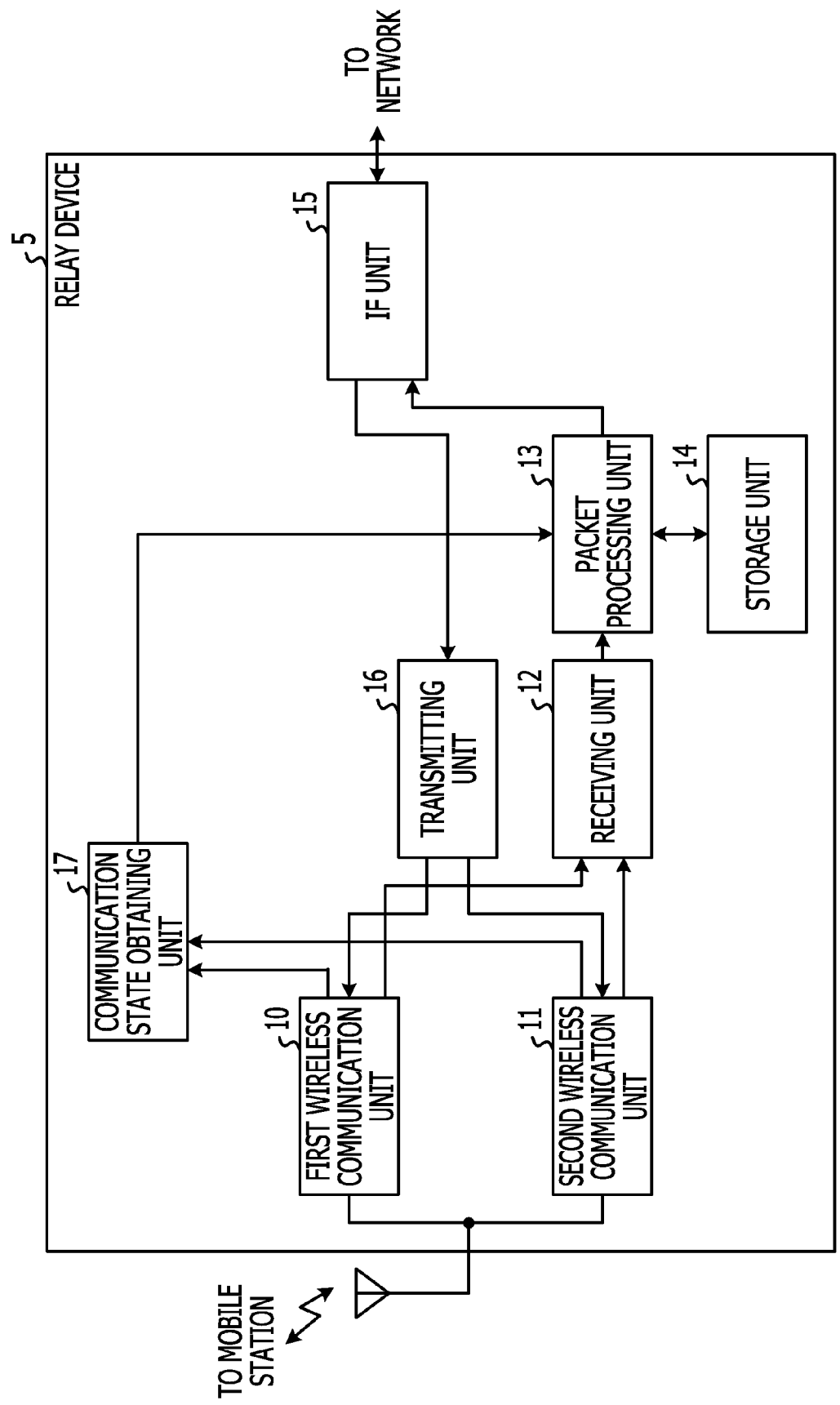
FIG. 9 is a functional configuration of a third example of a relay device.

FIG. 9 is a functional configuration of a third example of the relay device 5. The relay device 5 of the third embodiment transmits duplicate ACK packets without waiting for the abovementioned certain waiting period to elapse with regard to packets that were not successfully transmitted a certain maximum number of retransmission times.

The first wireless communication unit 10 and the second wireless communication unit 11 notify the communication state obtaining unit 17 about sequence numbers of packets that were not successfully transmitted the maximum number of retransmission times. The communication state obtaining unit 17 that receives the sequence number of the packets that were not successfully transmitted notifies the packet processing unit 13 about transmission failure information. The transmission failure information may include the sequence numbers of the packets for which transmission failed that were received from the first wireless communication unit 10 and the second wireless communication unit 11.

Upon receiving the transmission failure information from the communication state obtaining unit 17, the packet processing unit 13 determines whether a duplicate ACK packet for requesting retransmission of a packet with the sequence number included in the transmission failure information is stored in the storage unit 14. If a duplicate ACK packet for requesting a retransmission of a packet with a sequence number included in the transmission failure information is stored in the storage unit 14, the packet processing unit 13 transmits the duplicate ACK packet without waiting for the certain waiting period to elapse. If no such Duplicate ACK packet is stored in the storage unit 14, the packet processing unit 13 registers an entry related to the packet with the sequence number included in the transmission failure information, in a transmission failure information table 21.

FIG. 10 is an example of the transmission failure information table 21. The transmission failure information table 21 may be stored in the storage unit 14 for example. The transmission failure information table 21 includes information elements of an "IP address," a "TCP port number," a "TCP flow ID," and a "transmission failure SN." The IP address, the TCP port number, and the TCP flow ID respectively indicate an internet protocol (IP) address, a TCP port number, and a flow identifier of the mobile station 4 that is the address of each packet. The transmission failure SN indicates a sequence number of a packet for which transmission failed.

The first entry in FIG. 10 indicates that a transmission failure occurred for the packet with the sequence number "4835" and belonging to the flow having flow identifier "1" addressed to the IP address "IP#a" and the TCP port number "Port#a."

If a sequence number for which a retransmission is requested by the received duplicate ACK packet is a transmission failure SN registered in the transmission failure information table 21, the packet processing unit 13 transfers the duplicate ACK packet promptly to the IF unit 15 without storing the duplicate ACK packet in the storage unit 14.

Figure 11:
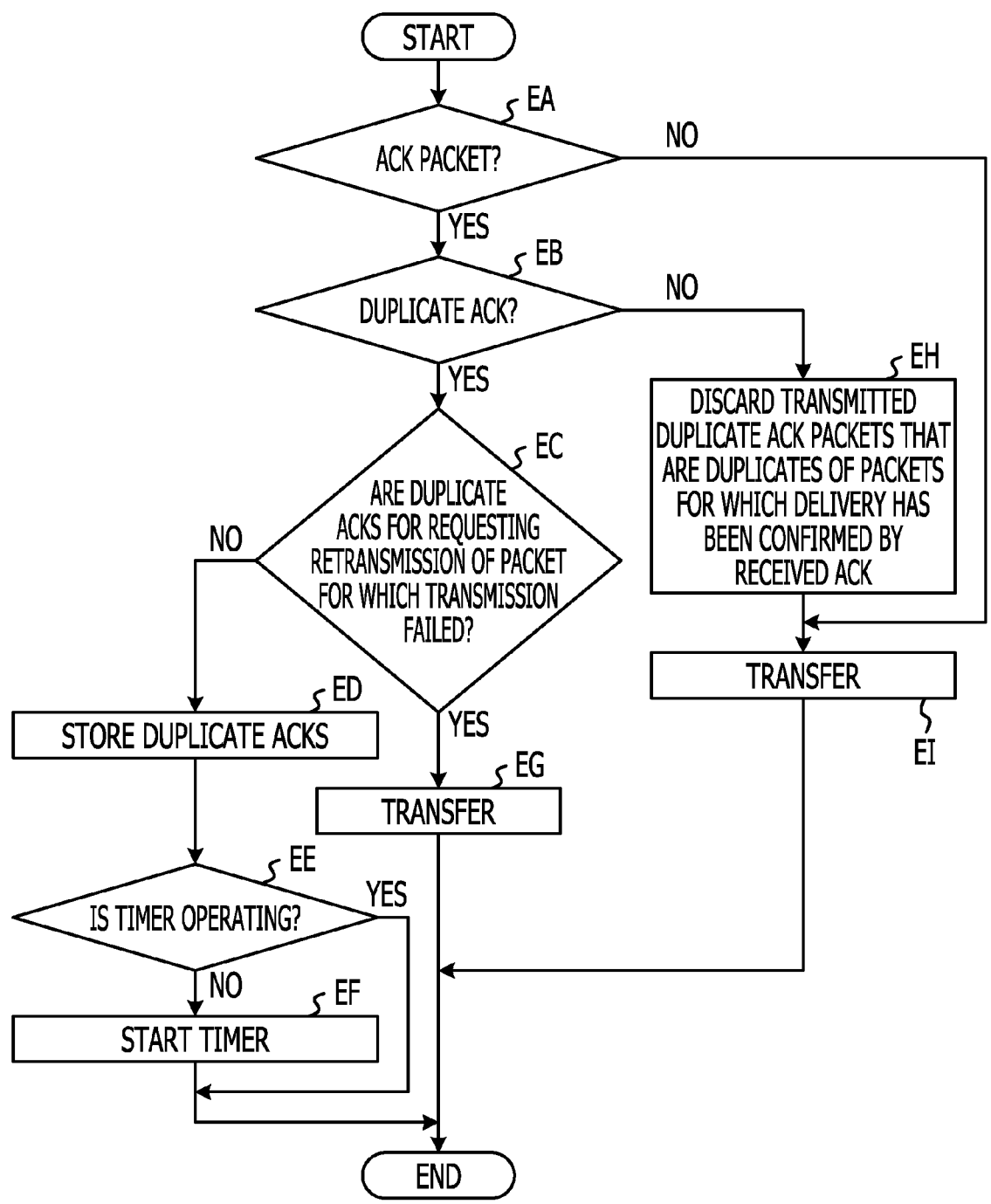
FIG. 11 describes a third example of a relay device operation during packet reception.

FIG. 11 describes a third example of the relay device 5 operation during packet reception. The packet processing unit 13 in operation EA determines whether a packet received from the receiving unit 12 is an ACK packet. If the received packet is an ACK packet (operation EA: Y), the operation advances to operation EB. If the received packet is not an ACK packet (operation EA: N), the operation advances to operation EI.

The packet processing unit 13 in operation EB determines whether the received ACK packet is a duplicate ACK packet. If the received packet is a duplicate ACK packet (operation EB: Y), the operation advances to operation EC. If the received packet is not a duplicate ACK packet (operation EB: N), the operation advances to operation EH.

The packet processing unit 13 in operation EC determines whether the received duplicate ACK packet is a duplicate ACK packet for requesting retransmission of a packet with a transmission failure SN registered in the transmission failure information table 21. If the received duplicate ACK packet is a duplicate ACK packet for requesting retransmission of a packet having a transmission failure SN (operation EC: Y), the operation advances to operation EG. If the received duplicate ACK packet is not a duplicate ACK packet for requesting retransmission of a packet having a transmission failure SN (operation EC: N), the operation advances to operation ED.

The operations ED to EF are the same as the operations AC to AE described in reference to FIG. 3. The packet processing unit 13 in operation EG transfers the received duplicate ACK packet to the IF unit 15. The processing is then finished. The operations EH to EI are the same as the operations AF to AG described in reference to FIG. 3.

Figure 12:
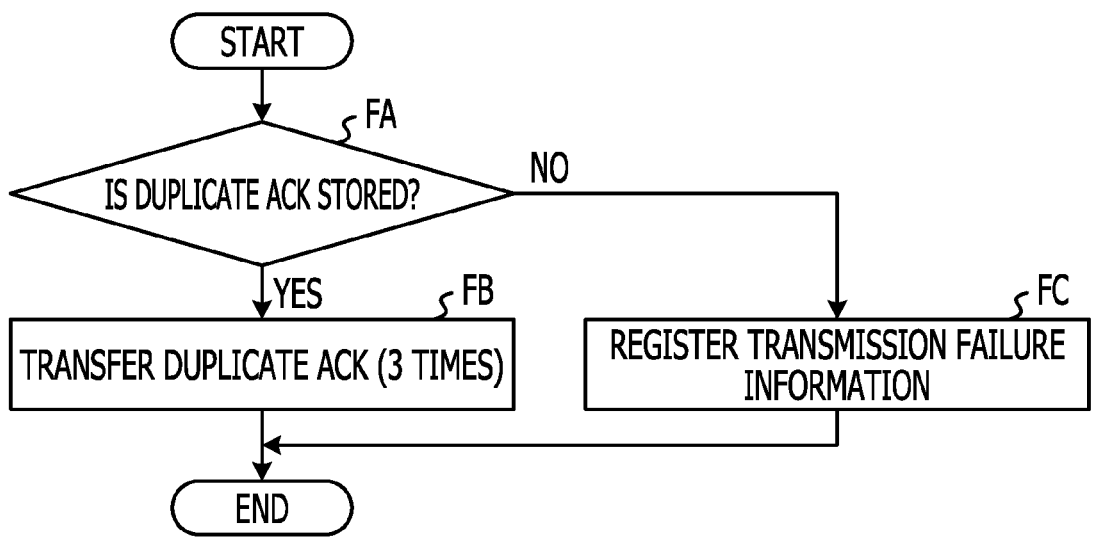
FIG. 12 describes an example of an operation by a packet processor upon receiving transmission failure information.

FIG. 12 describes an example of an operation by a packet processor 13 upon receiving transmission failure information. The packet processing unit 13 in operation FA determines whether a duplicate ACK packet for requesting retransmission of a packet with the sequence number included in the transmission failure information is stored in the storage unit 14.

If the duplicate ACK packet for requesting retransmission of the packet with the sequence number included in the transmission failure information is stored in the storage unit 14 (operation FA: Y), the operation advances to operation FB. If the duplicate ACK packet for requesting retransmission of the packet with the sequence number included in the transmission failure information is not stored in the storage unit 14 (operation FA: N), the operation advances to operation FC.

The packet processing unit 13 in operation FB transfers the duplicate ACK packet for requesting retransmission of the packet with the sequence number included in the transmission failure information to the IF unit 15 a certain number of times. The duplicate ACK packet transferred to the IF unit 15 the certain number of times is transmitted to the servers 3. The certain number of times for transferring the duplicate ACK packet may be determined in accordance with the transmitting device that is requested to retransmit the packet starting the retransmission process when the duplicate ACK packets have been received a number of times. The number of transfers of the duplicate ACK packet may be, for example, three times.

The packet processing unit 13 in operation FC registers the transmission failure information in the transmission failure information table 21.

According to the present embodiment, communication speed may be improved since the retransmission may be started at the point in time that the transmission of the packet failed in the radio link without waiting for a certain waiting period to elapse.

6. Fifth Embodiment

Figure 13:
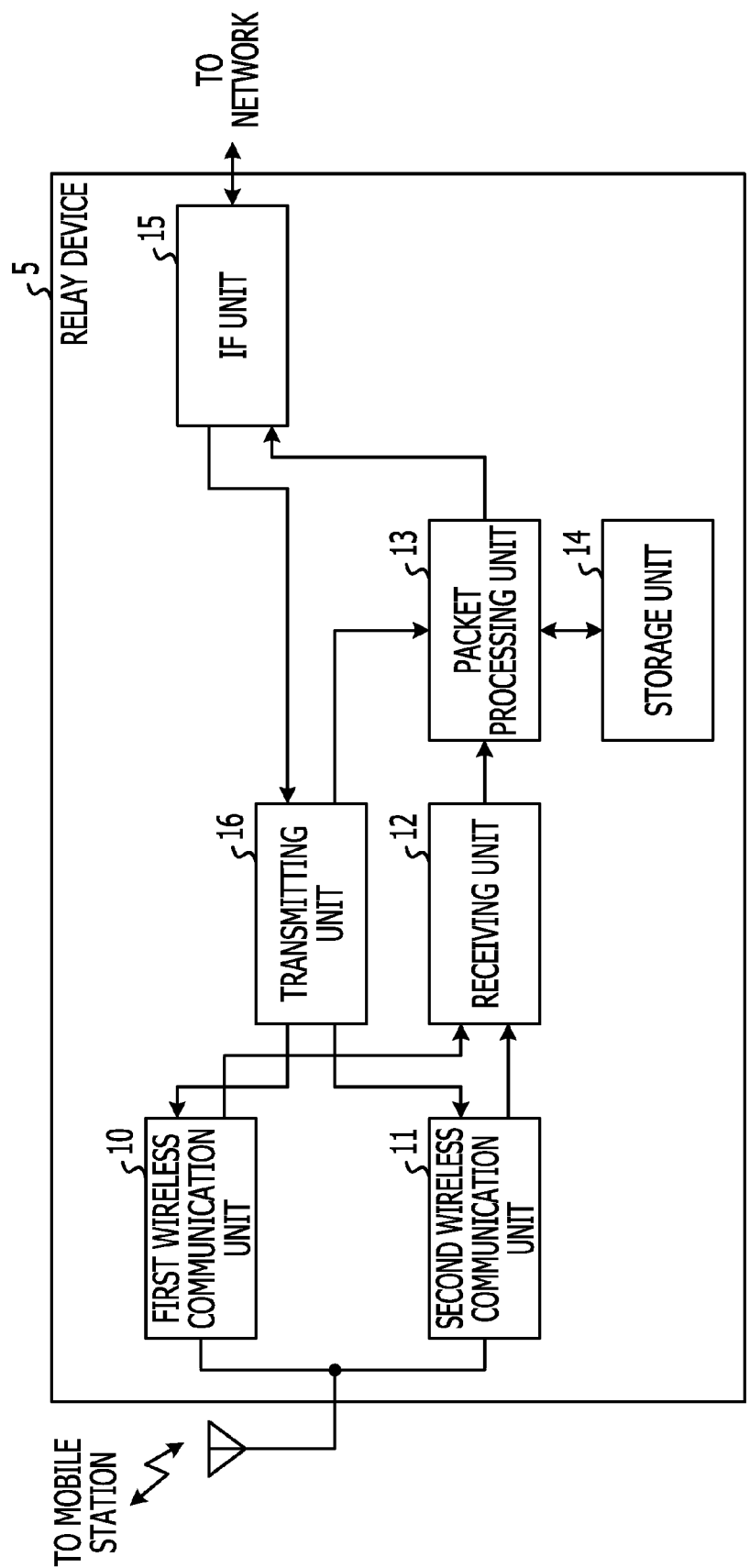
FIG. 13 is a functional configuration of a fourth example of a relay device.

FIG. 13 is a functional configuration of a fourth example of the relay device 5. Even if a group of packets in the same flow are sorted to the first radio link and the second radio link and transferred, a reversal of the packet arrival order does not occur among the individual radio link so long as there is no packet loss. Specifically, when looking only at the packets transferred on the first radio link, the packets arrive at the mobile station 4 in order from the lowest sequence number so long as there is no packet loss. Similarly, when looking only at the packets transferred on the second radio link, the packets arrive at the mobile station 4 in order from the lowest sequence number so long as there is no packet loss.

Therefore, when the delivery of packets having sequence numbers lower than the sequence numbers of packets for which delivery has been confirmed, is not confirmed among the packets transmitted on one radio link, a loss of the unconfirmed packets may occur in a wireless segment. The relay device 5 of the fifth embodiment transmits the duplicate ACK packets without waiting for the waiting period to elapse when the delivery of packets having sequence numbers lower than the sequence numbers of packets for which delivery has been confirmed, is not confirmed among the packets transmitted on one radio link.

The transmitting unit 16 notifies the packet processing unit 13 about information of a sorting destination radio link and the identifier and the sequence number of the flow to which the packet belongs when sorting packets between the first radio link and the second radio link. The packet processing unit 13 registers an entry that includes the radio link information, the flow identifier, and the sequence number received from the transmitting unit 16, in a packet management table 22.

FIG. 14 is an example of the packet management table 22. The packet management table 22 may be stored in the storage unit 14 for example. The packet management table 22 includes information elements of an "IP address," a "TCP port number," a "TCP flow ID," a "transmitted SN," a "link," and a "delivery confirmation."

The IP address, the TCP port number, the TCP flow ID, and the transmitted SN respectively indicate the IP address, the TCP port number, the identifier, and the sequence number of the mobile station 4 that is the destination of each of the transmitted packets. The link indicates the radio link on which the packet has been transmitted, and the delivery confirmation indicates whether the packet delivery has been confirmed or not.

The first entry in FIG. 14 indicates that the delivery of the packet having the sequence number "500," belonging to the flow having flow identifier "3" addressed to the IP address "IP#a" and the TCP port number "Port#a," and transmitted on the first radio link, has not been confirmed.

The second entry in FIG. 14 indicates that the delivery of the packet having the sequence number "1000," belonging to the flow having flow identifier "3" addressed to the IP address "IP#a" and the TCP port number "Port#a," and transmitted on the second radio link, has been confirmed.

When an ACK packet is received, the packet processing unit 13 updates the value of the delivery confirmation in packet management table 22 entry related to the sequence number for which delivery has been confirmed by the ACK packet, to "unconfirmed" or "confirmed." A TCP selective acknowledgment (selective ACK) option may be used in the present embodiment for the packet processing unit 13 to detect each of the sequence numbers for which delivery has been confirmed.

When a duplicate ACK packet is received, the packet processing unit 13 refers to the packet management table 22. The packet processing unit 13 determines whether a packet for which delivery has not been confirmed and which has a sequence number lower than a sequence number for which delivery has been confirmed, is present among the packets received on the radio link that is the same as the link that received the duplicate ACK packet.

If a packet is present for which delivery has not been confirmed and which has a sequence number lower than a sequence number for which delivery has been confirmed, there is a concern that the packet may have been lost in a radio segment. In the example of the packet management table 22 in FIG. 14, while the delivery of the packet with the sequence number "2000" transmitted on the first radio link has been confirmed, the delivery of the packet with the sequence number "500" is unconfirmed. In this case, the packet with the sequence number "500" may have been lost in a radio segment. As a result, the packet processing unit 13 transfers the duplicate ACK packet to the IF unit 15 without waiting for the waiting period to elapse.

Figure 15:
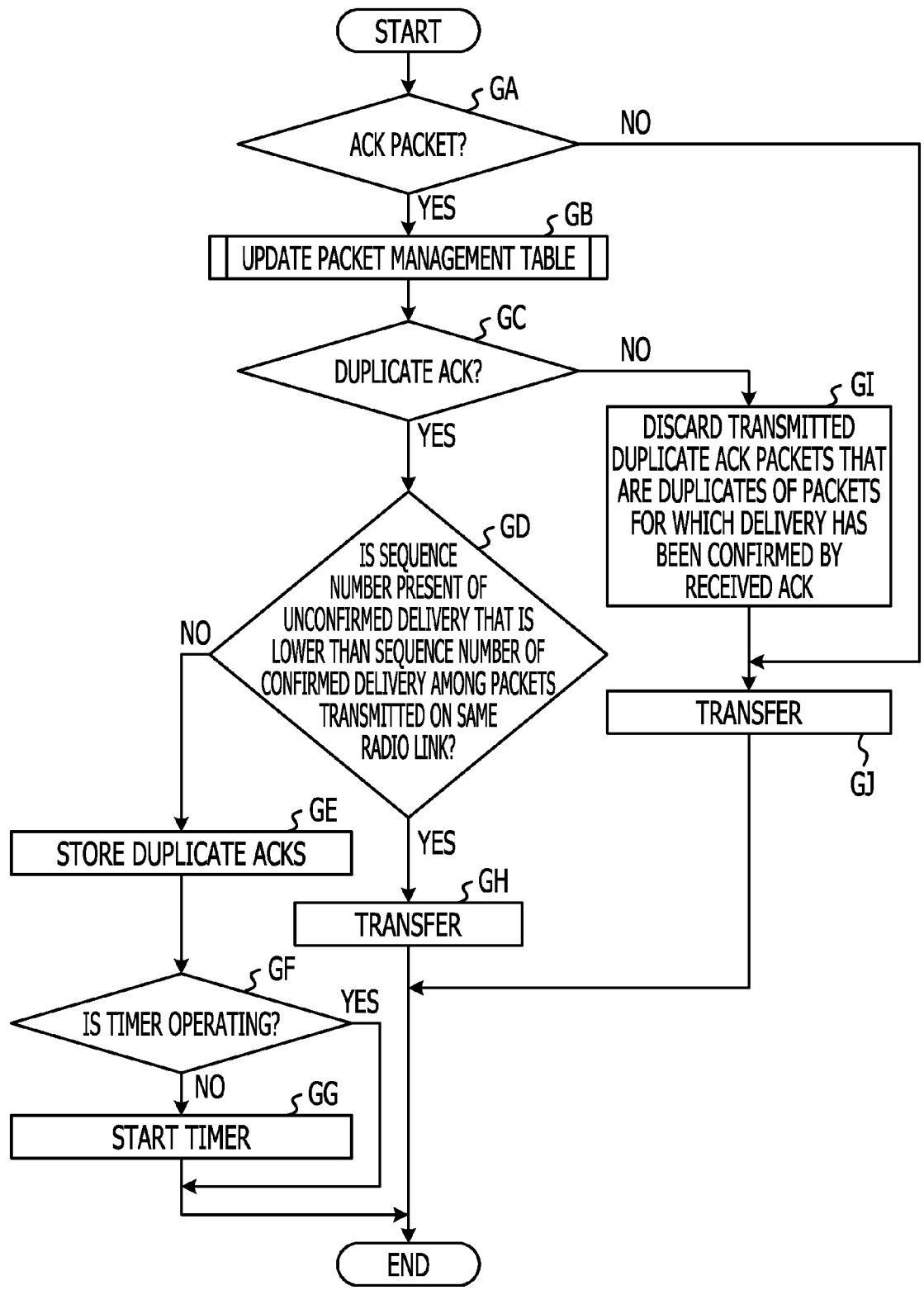
FIG. 15 describes a fourth example of a relay device operation during packet reception.

FIG. 15 describes a fourth example of the relay device 5 operation during packet reception. The packet processing unit 13 in operation GA determines whether a packet received from the receiving unit 12 is an ACK packet. If the received packet is an ACK packet (operation GA: Y), the operation advances to operation GB. If the received packet is not an ACK packet (operation GA: N), the operation advances to operation GJ.

The packet processing unit 13 in operation GB updates the packet management table 22. The updating operation of the packet management table 22 when an ACK packet is received is explained below with reference to FIG. 16B.

The packet processing unit 13 in operation GC determines whether the received ACK packet is a duplicate ACK packet. If the received packet is a duplicate ACK packet (operation GC: Y), the operation advances to operation GD. If the received packet is not a duplicate ACK packet (operation GC: N), the operation advances to operation GI.

The packet processing unit 13 in operation GD determines whether there is a sequence number of an unconfirmed delivery that is lower than the sequence number of a confirmed delivery among the packets transmitted on the same radio link as the link from which the duplicate ACK packet was received. If a sequence number of an unconfirmed delivery that is lower than the sequence number of a confirmed delivery is present (operation GD: Y), the operation advances to operation GH. If no sequence number of an unconfirmed delivery that is lower than the sequence number of a confirmed delivery is not present (operation GD: N), the operation advances to operation GE.

The operations GE to GJ are the same as the operations ED to EI described in reference to FIG. 11.

Figure 16A:
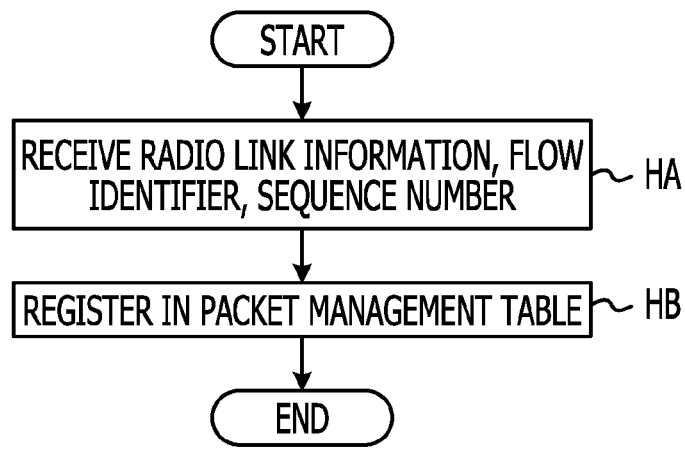
FIG. 16A describes an example of an updating operation in the packet management table during packet transmission, and FIG. 16B describes an example of an updating operation in the packet management table during ACK packet reception.

FIG. 16A describes an example of an updating operation in the packet management table 22 when a packet is transmitted. When the transmitting unit 16 transmits a packet, the packet processing unit 13 in operation HA receives the information of the radio link on which the packet was transmitted, the identifier of the flow to which the packet belongs, and the sequence number from the transmitting unit 16.

The packet processing unit 13 in operation HB registers an entry that includes the radio link information, the flow identifier, and the sequence number received from the transmitting unit 16, in the packet management table 22.

Figure 16B:
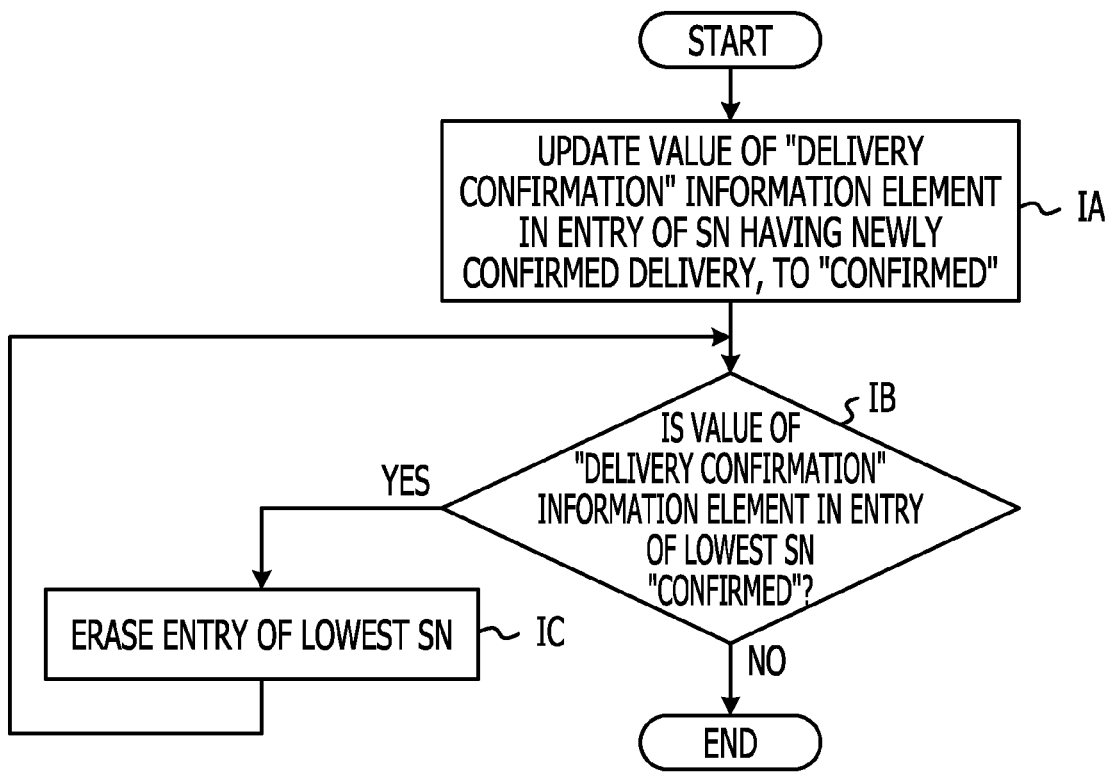

FIG. 16B describes an example of an updating operation in the packet management table 22 when an ACK packet is received. The packet processing unit 13 in operation IA updates the value of the delivery confirmation in the packet management table 22 entry related to the sequence number for which delivery has been confirmed by the ACK packet, to "confirmed."

The packet processing unit 13 in operation IB determines whether the value of delivery confirmation of the entry with the lowest sequence number is "confirmed" or not among the sequence numbers of the packets transmitted on the same radio link as the link from which the ACK packet was received. If the value of the delivery confirmation of the lowest sequence number entry is "confirmed" (operation IB: Y), the operation advances to operation IC.

The packet processing unit 13 in operation IC erases the entry of the lowest sequence number from the packet management table 22 and the operation returns to operation IB. If the value of the delivery confirmation of the lowest sequence number entry is not "confirmed" (operation IB: N), the updating operation is finished.

According to the present embodiment, communication speed may be improved since the retransmission may be started at the point in time that the transmission of the packet failed in the radio link without waiting for a certain waiting period to elapse.

The functional configurations in FIGS. 2, 7, 9 and 13 in the above explanation focus on configurations related to the functions described herein. The relay device 5 may include constituent elements other than those illustrated. The series of operations described with reference to FIGS. 3, 6, 8, 11, 12, 15, 16A and 16B may be understood to include a plurality of procedures. In this case, the word "operation" may be replaced with the word "step."

7. Hardware Configuration

Figure 17:
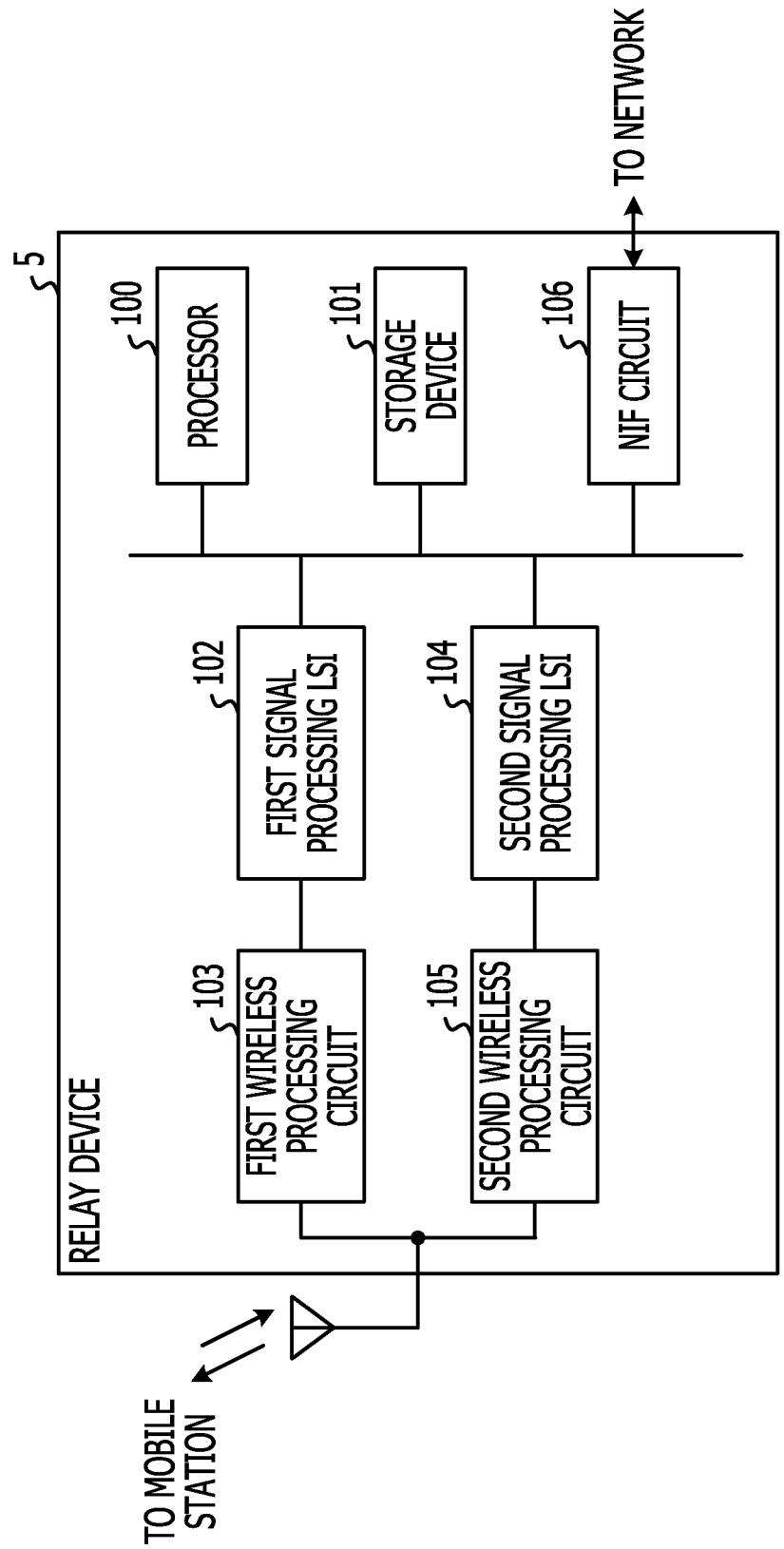
FIG. 17 is an example of a hardware configuration of a relay device.

The following is an explanation of an example of a hardware configuration of the relay device 5. FIG. 17 is an example of a hardware configuration of the relay device 5. The relay device 5 is provided with a processor 100, a storage device 101, a first signal processing large scale integration (LSI) 102, and a second signal processing LSI 104. The relay device 5 is provided with a first wireless processing circuit 103, a second wireless processing circuit 105, and a network interface circuit 106. In the following explanation and accompanying drawing, "network interface" is abbreviated as "NIF."

The storage device 101 may include a non-volatile memory, a read-only memory (ROM), a random access memory (RAM), or a hard disc drive device, for storing computer programs and/or data. The processor 100 controls the operations of the relay device 5 according to computer programs stored in the storage device 101.

The first signal processing LSI 102 implements baseband signal processing related to encoding and modulation and demodulation and decoding of signals according to a first protocol, communication protocol processing, and scheduling. The second signal processing LSI 102 implements baseband signal processing related to encoding and modulation and demodulation and decoding of signals according to a second protocol, communication protocol processing, and scheduling. The first signal processing LSI 102 and the second signal processing LSI 104 may include a field-programming gate array (FPGA), an application specific integrated circuit (ASIC), and/or digital signal processing (DSP) and the like.

The first wireless processing circuit 103 and the second wireless processing circuit 105 may include a digital-to-analog conversion circuit, an analog-to-digital conversion circuit, a frequency conversion circuit, an amplifying circuit, and/or a filter circuit and the like. The NIF circuit 106 is provided with an electronic circuit that conducts processing for a physical layer and a data processing layer for communication over the communication network 2.

The above operations of the first wireless communication unit 10 illustrated in FIG. 2 may be executed in collaboration with the first signal processing LSI 102 and the first wireless processing circuit 103. The above operations of the second wireless communication unit 11 may be executed in collaboration with the second signal processing LSI 104 and the second wireless processing circuit 105.

The operations of the receiving unit 12, the packet processing unit 13, and the transmitting unit 16 and of the communication state obtaining unit 17 and the sorting determining unit 18 illustrated in FIG. 7 may be executed by the processor 100. The above operations of the IF unit 15 may be executed by the NIF circuit 106.

The hardware configuration illustrated in FIG. 17 is merely an example for describing the embodiments. The relay device 5 described herein may use other hardware configurations so long as such configurations execute the processing described herein.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
a memory; and
a processor coupled to the memory and configured to execute a process, the process comprising,
transferring a first packet from a first device to a second device using a first channel,
after transferring the first packet, transferring a second packet from the first device to the second device using a second channel,
transferring a first acknowledge packet to the first device from the second device, the first acknowledge packet indicating that the second device anticipates receiving the first packet, determining whether a second acknowledge packet indicates that the second device anticipates receiving the first packet, when the apparatus receives the second acknowledge packet from the second device after receiving the first acknowledge packet,
delaying transferring the second acknowledge packet to the first device when it is determined that the second device anticipates receiving the first packet, and
discarding the second acknowledge packet when receiving a third acknowledge packet during the delay, the third acknowledge packet indicating that the second device anticipates receiving a third packet being transmitted or to be transmitted after the first device transmits the first packet,
wherein the second device receives the second packet before receiving the first packet due to a packet transfer time difference between the first channel and the second channel.

2. The apparatus according to claim 1,
wherein the process further comprises,
determining whether the transferring the second acknowledge packet is delayed for a period that is based on the packet transfer time difference between the first channel and the second channel; and
transferring the second acknowledge packet to the first device when it is determined that the transferring the second acknowledge packet is delayed for the period.

3. The apparatus according to claim 1,
wherein a length of the delay is based on a transfer delay difference between the first channel and the second channel.

4. A method comprising:
transferring a first packet from a first device to a second device using a first channel;
after transferring the first packet, transferring a second packet from the first device to the second device using a second channel;
transferring a first acknowledge packet to the first device from the second device, the first acknowledge packet indicating that the second device anticipates receiving the first packet;
determining whether a second acknowledge packet indicates that the second device anticipates receiving the first packet, when the apparatus receives the second acknowledge packet from the second device after receiving the first acknowledge packet;
delaying transferring the second acknowledge packet to the first device when it is determined that the second device anticipates receiving the first packet; and
discarding the second acknowledge packet when receiving a third acknowledge during the delay, the third acknowledge packet indicating that the second device anticipates receiving a third packet being transmitted or to be transmitted after the first device transmits the first packet,
wherein the second device receives the second packet before receiving the first packet due to a packet transfer time difference between the first channel and the second channel.

5. An apparatus comprising:
a first communication circuit configured to receive a plurality of packets from a communication device;
a second communication circuit configured to transmit a first packet included in the plurality of packets to a mobile station device through a first channel, and after transferring the first packet, transmit a second packet included in the plurality of packets to the mobile station through a second channel that is different from the first channel;
a receiving circuit configured to receive a duplicate acknowledgment packet corresponding to a delivery of the second packet, and to receive an acknowledgment packet corresponding to a delivery of the first packet after receiving the duplicate acknowledgment packet due to a packet transfer time difference between the first channel and the second channel; and
a processing circuit configured to stop a transfer of the duplicate acknowledgment packet to the communication device when the delivery of the second packet is confirmed by receiving an acknowledgment packet corresponding to the delivery of the second packet, and discard the duplicate acknowledgment packet corresponding to the delivery of the second packet when receiving the acknowledgment packet corresponding to the delivery of the first packet.

6. The apparatus according to claim 5, comprising:
a memory in which the duplicate acknowledgment packet is stored,
wherein the processing circuit is configured to discard the duplicate acknowledgment packet when the acknowledgment packet corresponding to the delivery of the second packet is received after receiving the duplicate acknowledgment packet.

7. The apparatus according to claim 5, wherein the processing circuit is configured to transfer the duplicate acknowledgment packet to the communication device when the acknowledgment packet confirming the delivery of the second packet is not received within a certain time period after receiving the duplicate acknowledgment packet.

8. The apparatus according to claim 7, wherein the certain time period is not less than a packet transfer time difference between the first channel and the second channel.

9. The apparatus according to claim 6, comprising:

a determining circuit configured to determine whether any of the plurality of packets have been lost in either the first channel or the second channel; and wherein the processing circuit is configured to transfer the duplicate acknowledgment packet to the communication device when the determining circuit determines that a packet has been lost.

10. The apparatus according to claim 9, wherein the determining circuit is configured to determine that a packet has been lost when a retransmission of a packet fails a predetermined number of times in the either of the channels.

11. The apparatus according to claim 9, wherein the determining circuit is configured to determine that a packet has been lost when an order of sequence numbers for which delivery is confirmed is reversed.

12. The method according to claim 4 further comprising:

determining whether the transferring the second acknowledge packet is delayed for a period that is based on the packet transfer time difference between the first channel and the second channel; and transferring the second acknowledge packet to the first device when it is determined that the transferring the second acknowledge packet is delayed for the period.

13. The method according to claim 4, wherein a length of the delay is based on a transfer delay difference between the first channel and the second channel.

\* \* \* \* \*